July 21, 1936.  A. O. MICKELSON ET AL  2,048,557

PROPELLING MECHANISM

Filed Dec. 23, 1933  3 Sheets-Sheet 1

Inventors
Alfred O. Mickelson,
Alexander J. Duaei,

Witness
Harry R. L. White

By Wilbur A. F. Mitchell, atty

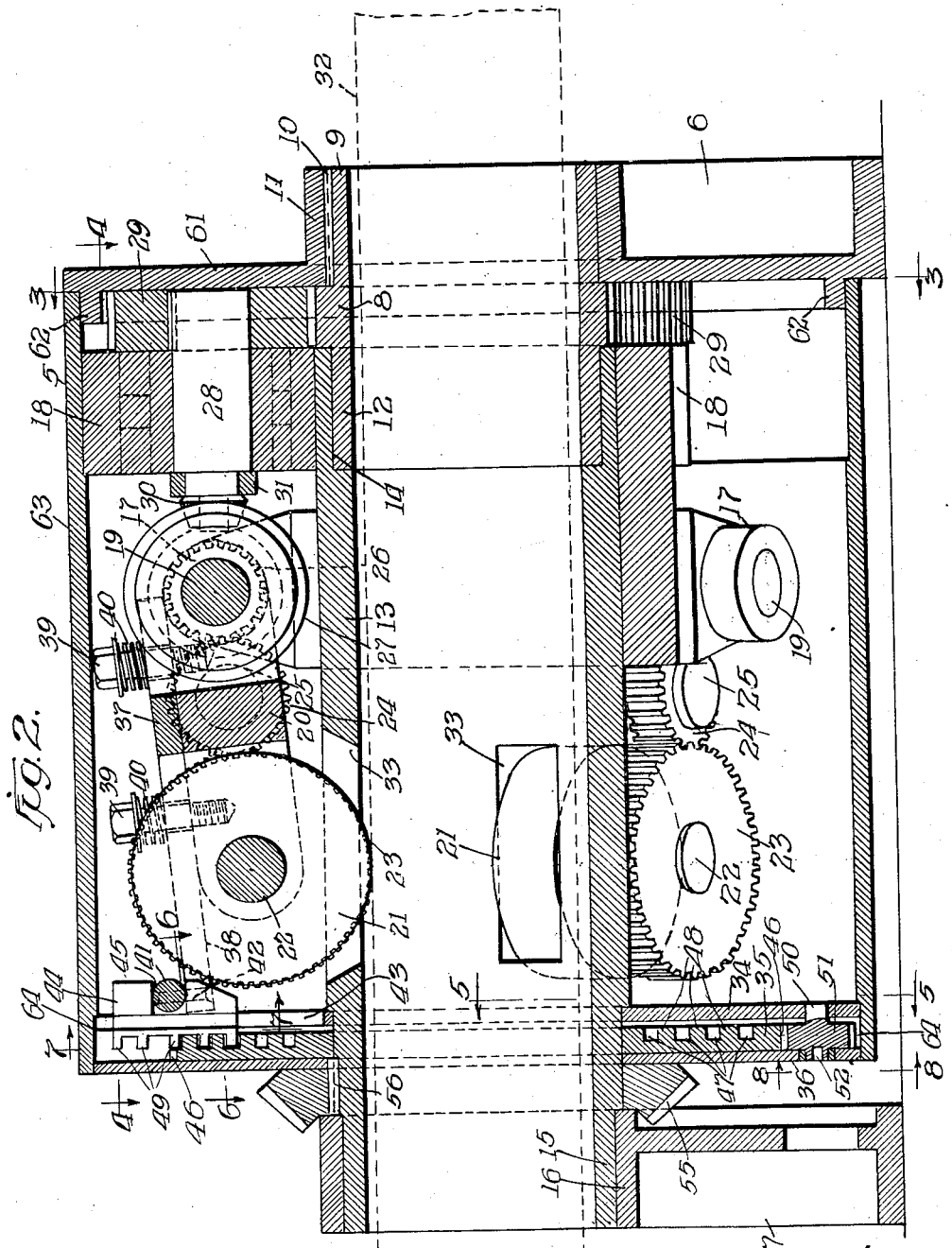

July 21, 1936.  A. O. MICKELSON ET AL  2,048,557
PROPELLING MECHANISM
Filed Dec. 23, 1933   3 Sheets-Sheet 3
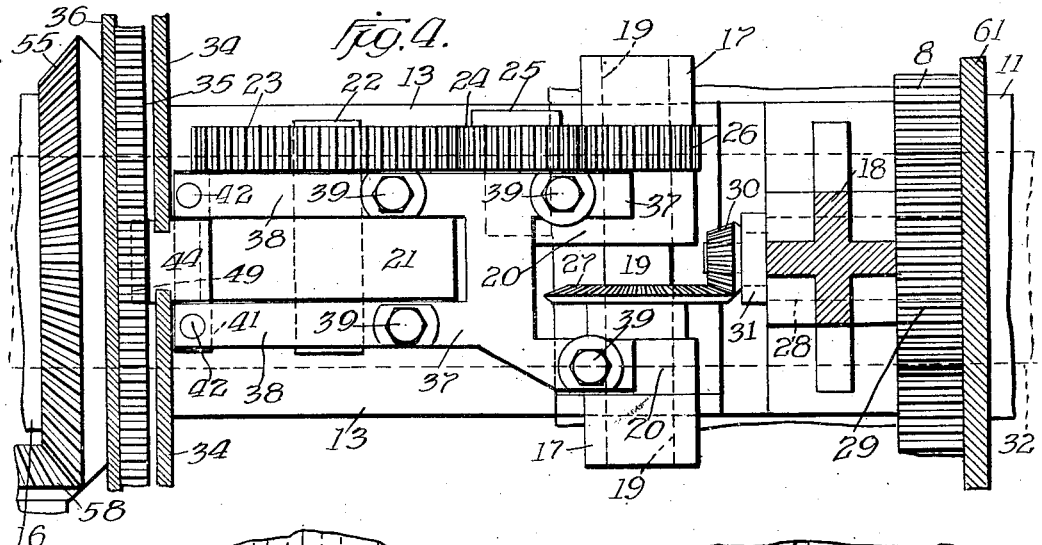
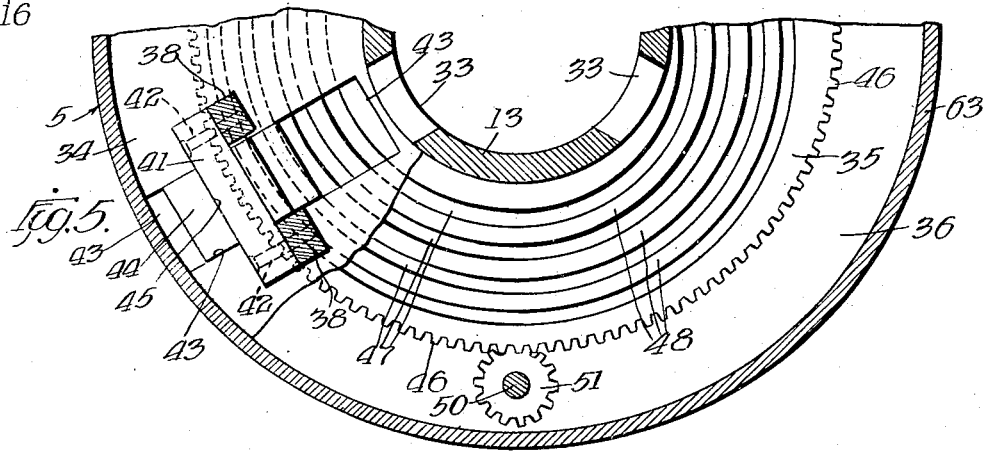
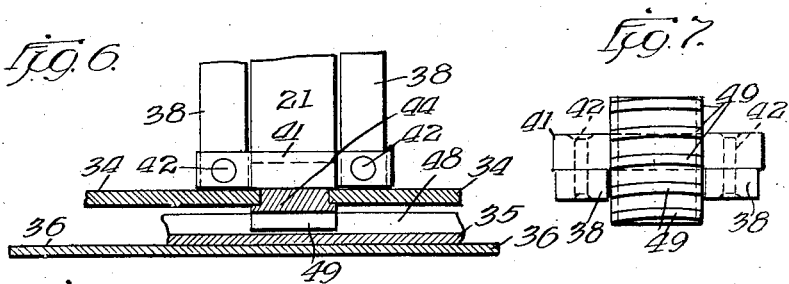
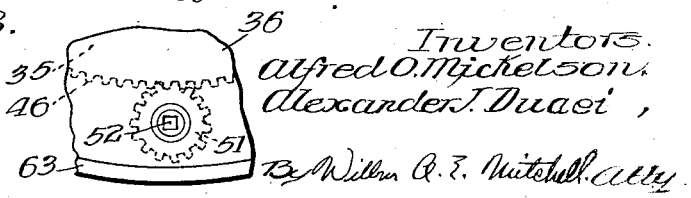
Witness:
Harry P. L. White
Inventors.
Alfred O. Mickelson
Alexander J. Duaei Patented July 21, 1936

2,048,557

UNITED STATES PATENT OFFICE 2,048,557

PROPELLING MECHANISM

Alfred O. Mickelson, Chicago, and Alexander J. Dusel, Lombard, Ill.

Application December 23, 1933, Serial No. 703,856

6 Claims. (Cl. 242—11)

This invention relates to propelling mechanisms, more particularly to mechanisms arranged to rotate and simultaneously move axially a long object such as a pipe, and specifically provides, as its principal object, a new and improved mechanism of this type.

In the prior art, of which we are aware, propelling mechanisms had been used in the pipe coating machines to rotate the pipe and simultaneously advance it through the machine longitudinally of its own axis. Certain ones of these prior art devices may be subject to criticism in that a considerable amount of work and time is necessary to change the mechanisms so that they will accommodate pipes of different sizes, and are further subject to criticism in that the amount of advance of the pipe per revolution is not always fixed.

The present invention improves upon these prior art devices by providing a mechanism arranged to advance the pipe a definite and unvarying distance for each revolution of the pipe and further arranged to permit easy adjustment of the machine to accommodate pipes of different sizes. The propelling mechanisms of our invention may be put to a number of uses in addition to its use in the pipe coating machine herein described by way of example.

Further objects of our invention will be apparent from the reading of a detailed description and claims as follows, reference being had to the accompanying drawings in which:

Figure 2 is a cross sectional view taken through the propelling mechanism along the line 2—2 looking in the direction of the arrows;

Figure 4 is a fragmentary view, partly in section, taken along the lines 4—4 of Figure 2 looking in the direction of the arrows;

Figure 5 is a fragmentary cross sectional view taken along the line of 5—5 of Figure 2 looking in the direction of the arrows and with parts of the mechanism broken away;

Figure 6 is a fragmentary cross sectional view taken along the lines 6—6 of Figure 2, showing the details of the adjusting mechanism;

Figure 7 is a view similar to Figure 6 taken along the line 7—7 and showing also the details of the adjusting mechanism; and, Figure 8 is a fragmentary view showing the adjusting spur gear.

Figure 1:
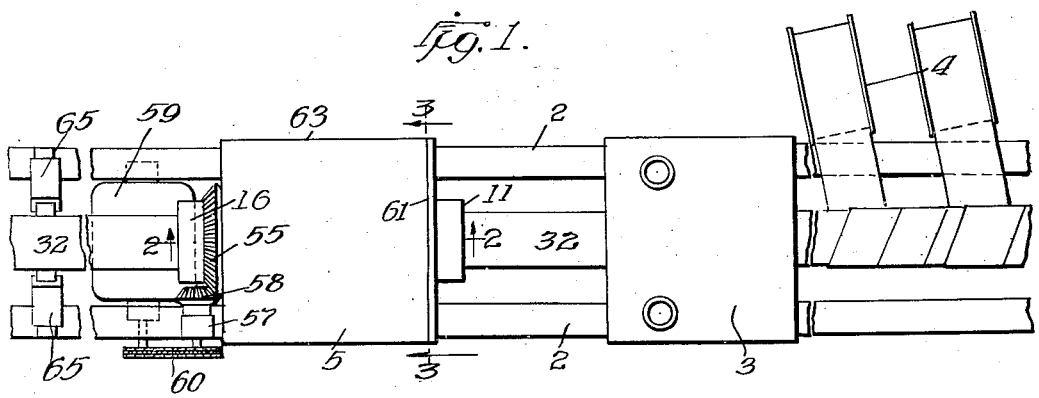
Figure 1 is a plan view of a pipe coating machine embodying the invention.

Referring now to the drawings in more detail, the pipe coating machine shown by way of example comprises a framework consisting of side channels 2 upon which are mounted a coating mechanism indicated generally at 3, a wrapping mechanism indicated generally at 4 and the propelling mechanism indicated generally at 5. The specific details of the construction of this framework is not of the essence of the present invention and may be varied. This machine is adapted to apply a cementitious and protective material, such as tar or asphaltum, to the pipe so that the fibrous material placed on the pipe by the wrapping mechanism 4 will be rigidly secured thereto.

The propelling mechanism, to which this application more particularly refers, comprises stationary brackets 6 and 7, Figure 2, fixed upon the rails 2 of the frame and adapted to serve as journals for the rotating parts of the mechanism. A stationary ring gear 8 is provided with a collar 9 that is keyed by a suitable key 10 into the hub 11 of the bracket 6. Ring gear 8 is also provided with a collar-like projection 12 extending from the gear inwardly of the mechanism.

Figure 3:
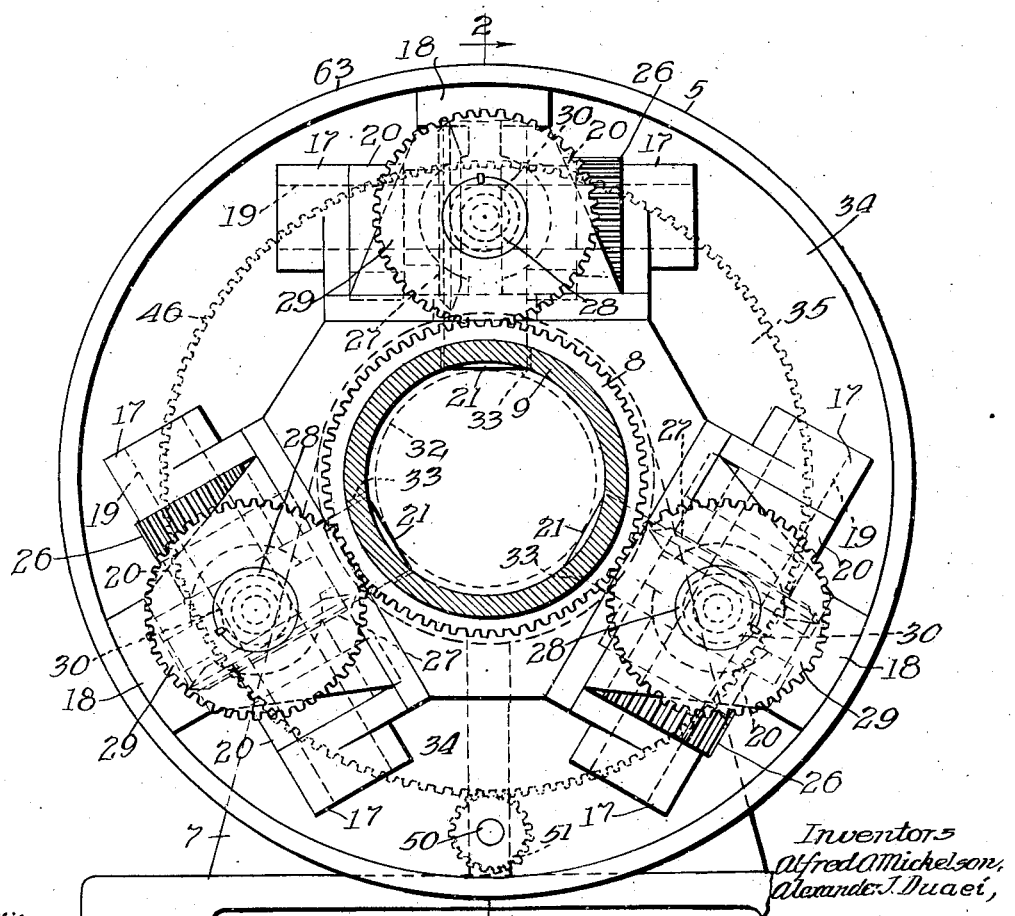
Figure 3 is a cross sectional view through the propelling mechanism taken along the line 3—3 of Figure 1 looking in the direction of the arrows.

The rotatable part, or spider, of the mechanism comprises a generally cylindrical hub member 13 that is recessed at 14 to register with the collar 12 and is shouldered at 15 to fit into hub portion 16 of the bracket 7. Projecting from outer periphery of the hub member 13 are groups of spaced ears 17, Figure 3, and journal brackets 18 located adjacent to the ears 17. The ears 17 and brackets 18 may be formed integrally with the hub 13 or may be formed separately therefrom and rigidly secured thereto in any preferred manner as by bolting or welding. As will be seen in Figure 4 adjacent ones of the ears 17 form a bearing for a stub shaft 19 which shaft serves as a hinge for pivotally connecting to the hub a generally H shaped bracket 20. Mounted in the free end of the bracket 20 is a roller 21 which is rigidly secured to and keyed upon a lay shaft 22. Shaft 22 projects beyond the bracket 20 to receive a spur gear 23 which is keyed thereto. An idler gear 24 is rotatably mounted by pin 25 upon the bracket 20. A spur gear 26 is upon and keyed to shaft 19 meshed with idler gear 24 to establish a driving connection between the shaft and the roller 21. A beveled gear 27 is also mounted upon and keyed to shaft 19. Journal bracket 18 is provided with a shaft 28 on one end of which is keyed a spur gear 29 that is meshed with stationary ring gear 8. The other end of shaft 28 carries a beveled gear 30 which is meshed with beveled gear 27. A split washer 31, fitted in a groove in shaft 28 adjacent to beveled gear 30, serves to lock the shaft in the journal bracket 18.

As shown in the drawings the rotatable spider of the mechanism is provided with three pairs of ears 17, and there are three sets of rollers, gears and shafts. Each of these sets is identical with the one just described and further description of the same is not necessary herein.

Rollers 21 are formed of a resilient composition such as, for example, fabric impregnated with rubber, it being the principal function of these rollers to engage the work that is being propelled through the machine and to rotate and move the same longitudinally.

In Figure 2 I have shown a pipe 32 in dotted lines to indicate its position in the machine. It will be seen that the cylindrical hub is provided with openings 33 through which rollers 21 project into engagement with the pipe. It will be apparent that the amount of projection of the rollers through the openings 33 will depend upon the diameter of the pipe then in the machine, and to permit rapid and accurate adjustment of the rollers radially inwardly and outwardly of the hub, we have provided an adjusting mechanism.

The end of the hub adjacent to bearing 16 is collared to provide a seating for a slotted adjusting disc 34, a ring gear 35, and a holding disc 36, as will be seen in Figures 2, 4, 5 and 6. The bracket 20 carries an adjusting lever 37 which is of the same general shape as the bracket and extends therebeyond as shown at 38. Lever 37 is fixed upon bracket 20 by suitable stud screws 39 and springs 40. At the free end of lever 38 we have provided a pin 41 rigidly fixed to the lever by bolts or rivets 42.

Disc 34 is provided with a plurality of radially disposed slots 43 into each one of which is slidably fixed an adjusting lug 44. Lugs 44 are recessed at 45 to receive pins 41.

Ring gear 35 is provided with teeth 46 which project radially from this outer periphery. The face of this gear adjacent to the disc 35 is provided with a spiral-shaped slot 47 recessed into the gear to form a spiral tooth 48. The tooth 48 makes a plurality of convolutions around the axis of the gear. As will be seen in Figures 6 and 7, lugs 44 are provided with teeth 49 that register with the spiral tooth 48 in the adjusting gear.

Discs 34 and 36 are perforated, as shown at 50, in Figure 2, to receive the hub of a spur gear 5, this hub being provided with a rectangular recess 52 into which an adjusting wrench can be inserted to rotate the gear. Rotating gear 51 in one direction rotates gear 35, and spiral tooth 48, through its engagement with teeth 49 on the adjusting lugs 44, moves the lugs in the slots 43 in disc 34. This movement of the lugs rotates adjusting lever 37 bracket 20 around the axis of shaft 19 thereby to move roller 21 radially of the spider structure.

Hub 13 is provided with a beveled gear 55 located adjacent to journal 16 and keyed to the hub by a suitable key 56. A journal bracket 57, Figure 1, is mounted upon a side member 2 of the frame of the machine and serves as a support for a beveled gear 58 which is meshed with gear 55. The frame of the machine also carries a motor 59, or other suitable source of power, which is connected to beveled gear 58 by a suitable power transmitting means 60 which may be a chain.

The stationary bracket 6 is provided with a generally circular portion 61 having bosses 62 which serve as supports for a cover plate 63. The free end of the cover plate 63 rests upon the outer peripheries of discs 34 and 36 and is machined as shown at 64 to provide a smooth surface for bearing upon these discs. Cover plate 63 serves to completely encase the operating parts of the propelling mechanism.

In the operation of the pipe coating machine shown, pipe 32 is projected into the propelling device 5. The frame of the machine is provided with suitable brackets 65 which support the pipe. An adjusting wrench is then inserted into the rectangular socket 52 in the gear 51 and that gear rotated thereby to move rollers 21 inwardly so that they engage the pipe under considerable tension. The source of power 59 is then started and the propelling mechanism is rotated through the operation of gears 55 and 58. Rotation of the gear 55 causes the hub 13 to rotate upon collar 12 and journal brackets 18 are thus moved around the axis of ring gear 8. This movement of the journal bracket causes stationary ring gear 8 to rotate gears 29 meshed therewith. Rotation of gears 29 operates gears 27 and 30 to rotate shafts 19 which, through gears 23, 24 and 26, rotate rollers 21. The rotation of rollers 21 rotates the pipe and advances the pipe longitudinally of the coating machine, and pushes it through the coating mechanism 3 and wrapping mechanism 4. As shown the coating machine is provided with but one coating mechanism and one wrapping mechanism, it being understood that a plurality of such units may be used if desired, within the teachings of our invention.

It may happen that pipe 32 is not definitely cylindrical and consequently rollers 21 may have to move radially to pass over irregularities in the pipe. Should the irregularity drive roller 21 outwardly from the hub 13, lever 37 will fulcrum at the outermost end of lever 20, and since the free end of lever 37 is fixed by pin 41, the end of it adjacent to shaft 19 will move outwardly from lever 20 against the tension of springs 40. When the irregularity has passed springs 40 will restore the levers to the position in which they are shown.

While we have chosen to show our invention by illustrating and describing a preferred embodiment of it, we have done so by way of example only and are not to be limited thereby.

What we consider new and desire to have protected by Letters Patent is pointed out in the appended claims.

What is claimed is:

1. A propelling mechanism comprising a journal bracket, a ring gear keyed in said journal bracket and having an extension projecting therefrom, a hollow hub journalled for rotation around said extension, bearing means for supporting the free end of said hub, spaced pairs of bosses projecting radially from said hub, brackets registered with said bosses, pins projected through said bosses and brackets to hinge the bracket to the hub, a roller pivotally mounted in the free end of each one of said brackets, gear means connecting said rollers to said ring gear, an adjusting ring journalled upon said hub, means connecting said ring to said brackets, means for rotating said ring around the hub to thereby move said rollers radially of the hub, and means for rotating said brackets and rollers around the axis of the hub to cause said gear means to rotate the rollers around their respective axes.

2. The combination with a propelling mechanism having rollers pivotally supported in brackets that are hinged upon a rotatable hub, of an adjusting mechanism for moving the rollers radially of the hub comprising, a lever extending from each hinged bracket, a radially slotted disc journalled upon the hub, lugs fitted in the slots and engaging the levers, and means for moving the lugs radially of the hub.

3. The combination with a propelling mechanism having rollers pivotally supported in brackets that are hinged upon a rotatable hub, of an adjusting mechanism for moving the rollers radially of the hub comprising, a lever extending from each hinged bracket, a disc journalled upon the hub and having radial slots corresponding in number to the number of said levers, a lug fitted in each one of said slots and engaging the corresponding lever, and means for moving said lugs simultaneously in a direction radially of the hub.

4. The combination with a propelling mechanism having rollers pivotally supported in brackets that are hinged upon a rotatable hub, of an adjusting mechanism for moving the rollers radially of the hub comprising, a lever extending from each hinged bracket, a disc journalled upon the hub and having radially disposed slots corresponding in number to the number of levers, a lug fitted in each one of said slots and engaging the corresponding lever, teeth on the lugs, an adjusting ring journalled on the hub, and means on said adjusting ring engaging the teeth on the lugs and adapted to move the lugs in said slots as the ring is rotated.

5. The combination with a propelling mechanism having rollers pivotally supported in brackets that are hinged upon a rotatable hub, of an adjusting mechanism for moving the rollers radially of the hub comprising, a lever extending from each hinged bracket, a disc journalled upon the hub and having radially disposed slots corresponding in number to the number of levers, a lug fitted in each one of said slots and engaging the corresponding lever, teeth on the lugs, an adjusting ring journalled on the hub, a spiral tooth on said ring registered with the teeth on said lug, and means for rotating the ring to move the lugs radially of the hub.

6. The combination with a propelling mechanism having rollers pivotally supported in brackets that are hinged upon a rotatable hub, of an adjusting mechanism for moving the rollers radially of the hub comprising, an adjusting ring, a spiral tooth on the face of said rings, lug mounted for sliding movement radially of the hub, teeth on said lugs engaged with said spiral tooth, means for rotating the ring on the hub to move said lugs radially thereof, and resilient means connecting said lugs to said hinged brackets.

ALFRED O. MICKELSON.
ALEXANDER J. DUAEI.